US008533239B2

(12) United States Patent
DeFrang et al.

(10) Patent No.: US 8,533,239 B2
(45) Date of Patent: *Sep. 10, 2013

(54) DATA PACKAGING SYSTEM AND METHOD

(75) Inventors: Bruce A. DeFrang, Batavia, IL (US); Patrick R. Lee, Bolingbrook, IL (US); Gregory L. Bodine, Cary, NC (US)

(73) Assignee: CA, Inc., Islandia, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/108,803

(22) Filed: May 16, 2011

(65) Prior Publication Data

US 2011/0219040 A1    Sep. 8, 2011

Related U.S. Application Data

(63) Continuation of application No. 11/040,146, filed on Jan. 21, 2005, now Pat. No. 7,970,801.

(60) Provisional application No. 60/538,323, filed on Jan. 21, 2004.

(51) Int. Cl.
*G06F 7/00* (2006.01)

(52) U.S. Cl.
USPC .......................................... 707/809

(58) Field of Classification Search
None
See application file for complete search history.

(56) References Cited

U.S. PATENT DOCUMENTS

| 4,751,740 A | 6/1988 | Wright ............................. 382/1 |
| 5,119,465 A | 6/1992 | Jack et al. ...................... 395/500 |
| 5,694,598 A | 12/1997 | Durand et al. ................. 395/614 |
| 5,926,833 A | 7/1999 | Rasoulian et al. ............. 711/147 |
| 6,009,428 A | 12/1999 | Kleewein et al. ............... 707/10 |
| 6,202,099 B1 | 3/2001 | Gillies et al. .................. 709/317 |
| 6,209,124 B1 | 3/2001 | Vermeire et al. .................. 717/1 |
| 6,230,117 B1 | 5/2001 | Lymer et al. ..................... 703/22 |
| 6,331,894 B1 | 12/2001 | Shimizu ...................... 358/1.13 |
| 6,477,580 B1 | 11/2002 | Bowman-Amuah .......... 709/231 |
| 6,606,660 B1 | 8/2003 | Bowman-Amuah .......... 709/227 |
| 6,615,253 B1 | 9/2003 | Bowman-Amuah .......... 709/219 |
| 6,681,370 B2 | 1/2004 | Gounares et al. ............. 715/513 |
| 6,757,899 B2 | 6/2004 | Zhdankin et al. ............. 719/315 |
| 6,915,304 B2 | 7/2005 | Krupa .......................... 707/102 |
| 6,934,712 B2 | 8/2005 | Kiernan et al. ............... 707/102 |
| 7,046,691 B1 | 5/2006 | Kadyk et al. .................. 370/466 |
| 7,065,588 B2 | 6/2006 | Konda et al. .................. 709/246 |
| 7,831,604 B2 | 11/2010 | Britton et al. ................. 707/755 |

(Continued)

OTHER PUBLICATIONS

"Solaris 8 Internationalized Operating System" article, copyright 1994-2008 Sun Microsystems, Inc., printed from http://developers.sun.com/dev/.qadc/technicalpublications/artricles/sol8 i18n oe.html, 7 pages.*

(Continued)

*Primary Examiner* — Hung Q Pham
*Assistant Examiner* — Hubert Cheung
(74) *Attorney, Agent, or Firm* — Pillsbury Winthrop Shaw Pittman LLP

(57) ABSTRACT

A method for communicating data includes selecting a portion of data for communication to a remote computer with the data portion in device-dependent format and comprising at least an integer, a real number, or a binary value. A portable buffer is generated based on the selected data portion, the portable buffer comprising at least one device-independent data representation. The portable buffer is communicated to the remote computer for processing the data portion in a second device-dependent format.

23 Claims, 2 Drawing Sheets

(56) References Cited

U.S. PATENT DOCUMENTS

| | | | |
|---|---|---|---|
| 7,901,291 B2* | 3/2011 | Hecht et al. | 463/42 |
| 8,301,525 B2* | 10/2012 | Bray | 705/35 |
| 2001/0037345 A1 | 11/2001 | Kiernan et al. | 707/513 |
| 2002/0156811 A1 | 10/2002 | Krupa | 707/513 |
| 2002/0156872 A1 | 10/2002 | Brown | 709/219 |
| 2003/0028561 A1 | 2/2003 | Gounares et al. | 707/513 |
| 2003/0028761 A1* | 2/2003 | Platt | 713/150 |
| 2004/0088320 A1 | 5/2004 | Perry | 707/103 R |
| 2004/0123277 A1* | 6/2004 | Schrader et al. | 717/143 |
| 2004/0139153 A1 | 7/2004 | Heidenreich | 709/203 |
| 2004/0143660 A1 | 7/2004 | Dimitroff et al. | 709/224 |
| 2004/0167862 A1 | 8/2004 | Yabloko | 706/55 |
| 2012/0254260 A1* | 10/2012 | Irons | 707/809 |
| 2012/0323961 A1* | 12/2012 | Irons | 707/769 |

OTHER PUBLICATIONS

"Solaris 8 Transition Information" article, copyright 1994-2008 Sun Microsystems, Inc., printed from http://www.sun.com/software/solaris/support/sol8.xml, 2 pages.*

"Solaris 8 Internationalized Operating System" article, copyright 1994-2008 Sun Microsystems, Inc., printed from http://developers.sun.com/dev/gadc/technicalpublications/artricles/sol8_il8n_oe.html, 7 pages.

"Solaris 8 Transition Information" article, copyright 1994-2008 Sun Microsystems, Inc., printed from http://www.sun.com/software/solaris/support/so18.xml, 2 pages.

Watters et al., "Solaris 8: The Complete Reference", 2000, pp. 19-20.

* cited by examiner

200

DATA PACKAGING SYSTEM AND METHOD

CROSS-REFERENCE TO RELATED APPLICATIONS

This application is a continuation of U.S. patent application Ser. No. 11/040,146, entitled "Data Packaging System and Method," filed Jan. 21, 2005, which claims the benefit of U.S. Provisional Patent Application Ser. No. 60/538,323, entitled "Data Packaging System and Method," filed Jan. 21, 2004, the contents of which are hereby incorporated by reference in their entirety.

FIELD OF THE INVENTION

This disclosure relates generally to the field of data processing and, more particularly, to a data packaging system and method.

BACKGROUND OF THE INVENTION

Many current computing networks may be considered heterogeneous networks, implying that a plurality of disparate computing devices are communicably coupled. These disparate devices often use different encodings of the same data type. For example, an integer value stored on an INTEL®-compliant device is different from the same integer value stored on a device operated by a SUN™ operating system or a device operated by a UNIX™ operating system. Typically, applications residing on the heterogeneous network are responsible for reformatting received data that is in a disparate format. These applications often are customized or redesigned to be operable to reformat the differently encoded data.

SUMMARY OF THE INVENTION

This disclosure provides a data packaging system and method. In one embodiment, the method for communicating data includes selecting a portion of data for communication to a remote computer with the data portion in device-dependent format and comprising at least an integer, a real number, or a binary value. A portable buffer is generated based on the selected data portion, the portable buffer comprising at least one device-independent data representation. The portable buffer is communicated to the remote computer for processing the data portion in a second device-dependent format.

DESCRIPTION OF EXAMPLE EMBODIMENTS

Figure 1:
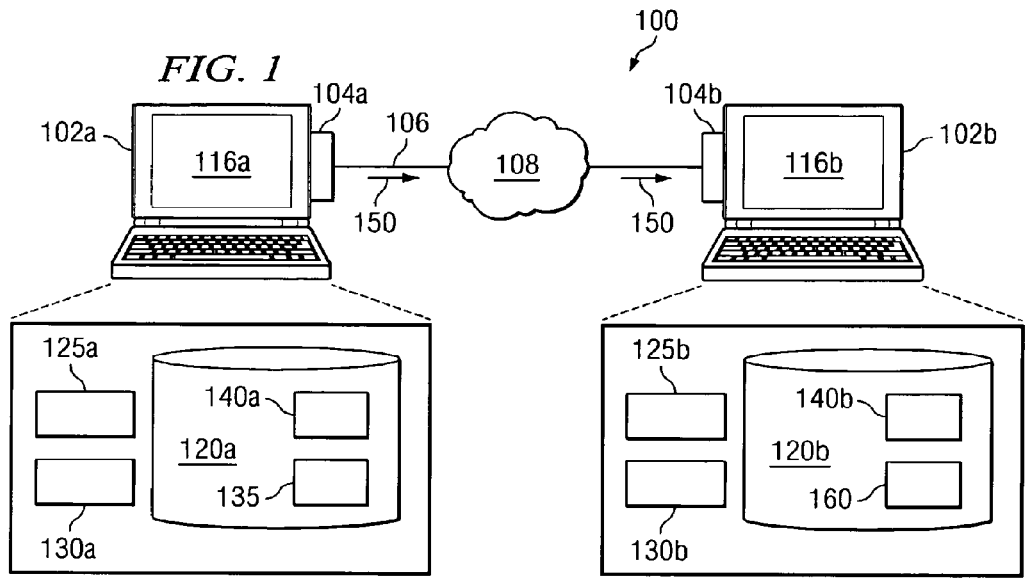
FIG. 1 illustrates an example system for packaging or communicating data in accordance with one embodiment of the present disclosure.

FIG. 1 is a block diagram illustrating a networked system 100 for automatically packaging data in a device-independent format according to one embodiment of the present disclosure. In general, the present disclosure contemplates any system 100 that converts stored data into a device-independent format on a first computer 102a, dynamically packages the converted data into a portable buffer 150, and communicates portable buffer 150 from first computer 102a to a second computer 102b for subsequent processing. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined at least partially at run-time based on one or more variables such as, for example, the operating system or hardware type of second computer 102b. Accordingly, system 100 may comprise a portion of a distributed computing system, two computers 102 remotely located but communicably connected across the Internet, or any other suitable data processing system.

According to the illustrated embodiment, each computer system 102 includes graphical user interface 116, memory 120, processor 125, and an input device such as a keyboard, mouse or touch screen. The illustrated computer 102 also includes self-defined data (SDD) engine 130 and dataset 135 that may be stored in memory 120 and executed or processed by processor 125. At a high level, as used in this document the term "computer" is intended to encompass a personal computer, workstation, server network computer, personal data assistant (PDA), dumb terminal, cell phone, pager, text message device, mainframe, or any other suitable data processing device. In other words, FIG. 1 only illustrates one example of a computer that may be used with the disclosure. Moreover, "computer system 102" and "user of computer 102" may be used interchangeably, as appropriate, without departing from the scope of this disclosure. Computer 102 may execute any operating system including UNIX™, WINDOWS™, LINUX™, and others. The present disclosure contemplates computers other than general purpose computers as well as computers without conventional operating systems. Further, while FIG. 1 illustrates two computers 102, system 100 may include any number of computers 102, including one, without departing from the scope of this disclosure. For example, computers 102a and 102b may represent two processes running separately on an individual computing device.

Computer 102 may include graphical user interface (GUI) 116, which comprises, at least, a graphical user interface operable to allow the user of computer 102 to interact with one or more processes executing on computer 102. Generally, GUI 116 provides the user of computer 102 with an efficient and user-friendly presentation of data provided by computer 102 or network 108. GUI 116 may comprise a plurality of displays having interactive fields, pull-down lists, and buttons operated by the user. In one example, GUI 116 presents an explorer-type interface and receives commands from the user. In another example, GUI 116 comprises a screen on a cell phone operable to present the phone user with data. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 102 and efficiently presents the information to the user. Network 108 can accept data from the user of computer 102 via the web browser (e.g., MICROSOFT® INTERNET EXPLORER® or NETSCAPE NAVIGATOR") and return the appropriate HTML, JAVA™, or eXtensible Markup Language (XML) responses.

Computer 102 may include an interface 104 for communicating with other computer systems over network 108 such as, for example, in a client-server or other distributed environment via link 106. In one example, SDD engine 130 receives data via network 108 for storage in memory 120. In another example, SDD engine 130 packages a device-independent representation of the data stored in memory into portable buffer 150 and communicates the packaged portable buffer 150 to another computer 102 via network 108. Network 108 facilitates wireless or wireline communication between various components of networked system 100, first computer 102a any other remote computer, and others. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 104 comprises logic encoded in software and/or hardware in a suitable combination and operable to communicate with network 108 via link 106. More specifically, interface 104 may comprise software supporting one or more communications protocols associated with link 106 and communications network 108 hardware operable to communicate physical signals.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. Illustrated memory 120a stores, or includes references to, dataset 135 and self-defined data tree 140. Generally, dataset 135 is device-dependent and includes a plurality of data objects of any appropriate data type, including float, integer, currency, date, Boolean, decimal, string, or any other numeric or non-numeric data type. Each data object is operable to store at least one logical value in the appropriate data type in the device-dependent format. For example, dataset 135 may comprise a relational database described in terms of SQL statements or scripts. Relational databases often use sets of schemas to describe the tables, columns, and relationships in the tables using basic principles known in the field of database design. In another embodiment, dataset 135 may comprise XML documents, flat files, Btrieve files, or comma-separated-value (CSV) files. Memory 120 may include any other suitable data or module or not include the illustrated elements without departing from the scope of this disclosure.

Processor 125 executes instructions and manipulates data to perform the operations of computer 102 and related modules, such as processing by self-defined data engine 130 to create self-defined data tree 140 based on data selected from dataset 135. Although FIG. 1 illustrates a single processor 125 in computer 102, multiple processors 125 may be used and reference to processor 125 is meant to include multiple processors 125 where applicable. Generally, self-defined data (SDD) engine 130 could include any hardware, software, firmware, application program interface (API), logic, or combination thereof operable to access dataset 135, generate self-defined data tree 140 based on the retrieved data, package tree 140 into portable buffer 150, and communicate portable buffer 150 within the scope of this disclosure. In other words, SDD engine 130 is any logical or physical component operable to maintain a list or tree 140 of device-independent values, associate identifiers to go with those values, and bundle tree 140 in portable buffer 150 that can be sent to computer 102b, saved to disk, or otherwise stored or transferred. For example, SDD engine 130 may be written or described in any appropriate computer language including C, C++, JAVA™, VISUAL BASIC®, any suitable version of 4GL (fourth generation programming language), and others. Further, it will be understood that while SDD engine 130 is illustrated as a single multi-tasked module, the features and functionality performed by this module may be performed by multiple local or distributed modules such as, for example, a data retrieval module, a tree generation module, a buffering module, and a communication module. In other words, SDD engine 130 may comprise a first SDD engine 130a and second SDD engine 130b distributed across multiple machine and communicably connected. Moreover, while not illustrated, SDD engine 130 may be a child or sub-module of another module or application without departing from the scope of this disclosure, so long as SDD engine 130 is partially involved in creating self-defined data tree 140 based on dataset 135.

Self-defined data tree 140 comprises a list of values in a device-independent format, organized into a logical hierarchy. Normally, this device-independent format allows for many and/or most, but not necessarily all, computing devices, running any suitable operating system or ASIC, to process the value. This enables disparate devices, executing unique operating systems and storing data in different formats, to easily and reliably communicate and process data. For example, the device-independent format may include UTF-8 string or any other suitable format. Each value in self-defined data tree 140 is often associated with an identifier such as a name, address, or any other characteristic operable to identify the value. Moreover, each value may be associated with a data type such as, for example, integer, float, real, binary, Boolean, character, string, memory address, or any other suitable data type. This allows each value to stored in the device-independent format, such as UTF-8 string, without losing the original data type. For example, self-defined data tree 140 may be a multi-dimensional array of a plurality of UTF-8 strings and associated names and data types. In short, self-defined data tree 140 comprises a device-independent data representation of any number of data objects, retrieved from dataset 135 in any appropriate format.

According to one embodiment, self-defined data tree 140 organizes the device-independent values using a list of entries defined by example SDD_HANDLE and SDD_POSITION variables. SDD_HANDLE is normally used to describe a subset of the entries logically residing at the same level or hierarchy in tree 140. Moreover, each tree 140 may be associated with a list handle, a name, a memory address, or any other appropriate uniquely identifier. Each entry in the list has a different SDD_POSITION.

The topmost SDD_HANDLE is considered the parent handle of this list. According to certain embodiments, each entry in the tree also has a child handle or set of children entries. In the situations where the entry is the lowest logical entry, the child SDD_HANDLE may include no entries. Accordingly, the combination of SDD_HANDLE and SDD_POSITION describes the logical location of one specific entry and, when appropriate, the parent and children of the entry. For example, self-defined data tree 140 may include the following list of example entries representing example data objects:

```
Id = Oranges
Id = Apples
   Id = Red Delicious
      Id = Sweetness, Type = text, Value = TART
      Id = Baking, Type = Boolean, Value = TRUE
   Id = Macintosh
   Id = Jonathan
      Id = Sweetness, Type = text, Value = TART
      Id = Baking, Type = Boolean, Value = TRUE
   Id = Braeburn
Id = Bananas
```

In the example, the topmost SDD_HANDLE identifies the subset of the logically highest entries including Oranges, Apples, and Bananas. But each subset of entries is identified by a different SDD_POSITION. In other words, while Oranges, Apples, and Bananas share the same SDD_HANDLE value, each is associated with a different SDD_POSITION value. At the next logical level, the entries located in the subset "Apples" include Red Delicious, Macintosh, Jonathan, and Braeburn. Each entry in the "Apples" subset of share one SDD_HANDLE, different from that of the highest logical level, but each is associated with a different SDD_POSITION value. This SDD_HANDLE is the child handle of the entry Apples. It will be understood that this example is for illustration purposes only and self-defined data tree 140 may include and number of data values, in any appropriate format, without departing from the scope of this disclosure.

Portable buffer 150 comprises any data stream that may be communicated to second computer 102*b* via network 108 or encoded in media for subsequent communication. Generally, buffer 150 is contiguous and portable to other platforms. In other words, buffer 150 comprises at least a communicable version of device-independent tree 140*b*. According to certain embodiments, SDD engine 130*a* converts, or packages, self-defined data tree 140*a* into portable buffer 150 for transport to any other computing device such as computer 102*b*. Portable buffer 150 may be communicated using IP packets, frames, cells, or any other appropriate data bundle using any communicable protocol. Computer 102*b* often uses SDD engine 130*b* to receive portable buffer 150, convert portable buffer 150 into second tree 140*b*, and communicate the data contained therein to an application 160.

Application 160 comprises any appropriate software module operable to process data stored in tree 140*b*. Application 160 may be written or described in any appropriate computer language including C, C++, JAVA™, VISUAL BASIC®, any suitable version of 4GL, and others. According to one embodiment, application 160 comprises a C-based software module with one or more APIs to SDD engine 130*b*. In this embodiment, application 160 may request or retrieve data from tree 140*b* via SDD engine 130*b* through the API. For example, tree 140*b* may comprise data stored in UTF-8 format, while application 160 may process data in Unicode (UTF-16) format. In this example, application 160 requests data from SDD engine 130*b*, which retrieves the requested data from tree 140*b* and communicates the data to application 160 in the requested format, in this case Unicode.

According to one aspect of operation, SDD engine 130*a* retrieves one or more data objects from dataset 135 based on a user request, automatically, or dynamically based on any suitable runtime variable. Next, SDD engine 130*a* initializes self-defined data tree 140. For example, SDD engine 130*a* may call an Init( ) function. This example function may be used to begin tree 140 processing. It creates a handle that is used in subsequent calls. According to certain embodiments, Init( ) returns a handle or, if no memory was available, a NULL value. Once the top handle in tree 140 is initialized, SDD engine 130*a* populates it with the retrieved data objects. This population may include importing another tree 140 into the current tree 140 without departing from the scope of the disclosure via an example ImportFromHandle( ) function utilizing pointers to the various trees 140. In one embodiment, this example function appends the contents to the end of the current tree 140.

SDD engine 130*a* may also populate self-defined data tree 140 or update or delete entries in self-defined data tree 140 such as, for example, using functions Insert( ), Update( ), and Delete( ). Example function Insert( ) may insert a new entry into tree 140. In one example embodiment, SDD engine 130*a* generally creates the entry by first determining the value in UTF-8 format, the identifier, the length, and the data type. SDD engine 130 typically converts the current data object into UTF-8 string format. Then, SDD engine 130*a* specifies the identifier to be given to the entry. It will be understood, however, that identifiers are optional and do not have to be unique. Returning to the example embodiment, SDD engine 130*a* may provide an identifier using a valid UTF-8 character string. SDD engine 130*a* may also specify the length of the value to be added to tree 140. This is usually used for binary and character string values. For a binary value, the length indicates the number of bytes of binary data. For a character string, the length would represent the number of characters. SDD engine 130*a* then specifies the data type of the entry to be added. Data type value include binary, character or string, long integer, short integer, Boolean, float, double, "no value," or any other appropriate data type. SDD engine 130*a* may further specify where the data is to be logically inserted in tree 140 using position and before/after parameters. The position parameter may have been returned from another function or method or may be set to the value SDD_POSITION_HEAD, to insert at the beginning, or SDD_POSITION_TAIL, to insert at the end. If set to SDD_POSITION_HEAD or SDD_POSITION_TAIL, the exemplary before/after parameter may not be used. This position will typically allow access to this entry, regardless of whether entries are subsequently added or deleted before or after the newly added entry.

Once an entry has been inserted in tree 140, SDD engine 130*a* may update it using, for example, an Update( ) function. This function may include the same parameters, with different one or more different values, as the Insert( ) that created the entry to be updated. For example, SDD engine 130 may use handle and position parameters to locate the entry, then update the UTF-8 value, change the length, the data type, or the identifier. In another example, SDD engine 130 may use the identifier to update the entry. Entries may also be delete from self-defined data tree 140. For example, SDD engine 130 may use example Delete( ) to locate and remove the requested entry. This example function, typically uses only the location parameters, such as SDD_HANDLE or SDD_POSITION, or the identifier. At any time, SDD engine 130 may navigate tree 140 for various purposes such as, for example, to access or create entries, to export just a portion of the tree, to import another list into the current list, or for any other suitable purpose.

Once SDD engine 130*a* is substantially finished populating or otherwise processing tree 140, then SDD engine 130*a* may export tree 140 to portable buffer 150 for communication to computer 102*b*, another remote data storage device, or another process running on computer 102*a*. When SDD tree 140 is to be saved on disk, sent across the network or otherwise exported, SDD engine 130 packages the lists into a contiguous buffer. In one embodiment, resulting buffer 150 may comprise all of the data in the form of UTF-8 character strings, saved back to back. Moreover, UTF-8 identifiers describing the data element name, type, and length may also be stored in buffer 150. For example, SDD engine 130 may call example Export function to automatically create portable buffer 150 based, at least in part, tree 140. Once buffer 150 has been created and communicated to computer 102b, SDD engine 130a may free the allocated memory such as, for example, by calling example ExportFree( ) function.

Continuing the example operation, computer 102b receives portable buffer 150 via network 108 and stores buffer 150 in memory 120b. SDD engine 130b then, at any suitable time, imports the contents of buffer 150 into a second self-defined data tree 140b. For example, SDD engine 130b may call example Import( ) function. In this example, Import( ) may cause the contents of buffer 150 to be appended to the end of tree 140b. If the list handle is null, i.e. tree 140b is yet to be created, then a list handle will be created in the process. Once tree 140b is created and substantially populated, SDD engine 130b may retrieve one or more data entries from tree 140b at any appropriate time. For example, SDD engine 130b may automatically retrieve data, dynamically select data based on any appropriate criteria, or use any other suitable selection and retrieval technique such as, for example, using example Get( ) function. This example function retrieves an entry out of SDD tree 140b by specifying which entry via using position and before/after parameters. As above, the position parameter is often used in conjunction with the before/after parameter to specify either the entry to retrieve (e.g., BeforeAfter=SDD_NO_ADVANCE), the entry prior to the entry to retrieve (e.g., BeforeAfter=SDD_AFTER), or the entry following the entry to retrieve (e.g., BeforeAfter=SDD_BEFORE). The example function may also retrieve data via example GetByld( ) function, which locates the appropriate data using an identifier associated with the data. Once SDD engine 130b collects the appropriate data, it may communicate the data to application 160, GUI 116, memory 120b, or to any other suitable destination. Once processing of tree 140b is processed by computer 102b, SDD engine 130b may destroy and free a list handle and associated tree 140b via any appropriate technique such as, for example, Destroy( ). It will be understood that the aforementioned example functions and parameters are for illustration purposes only and any appropriate variable or characteristic, function, method, library, module, algorithm, or any other suitable software component may be used without departing from the scope of this disclosure.

Figure 2:
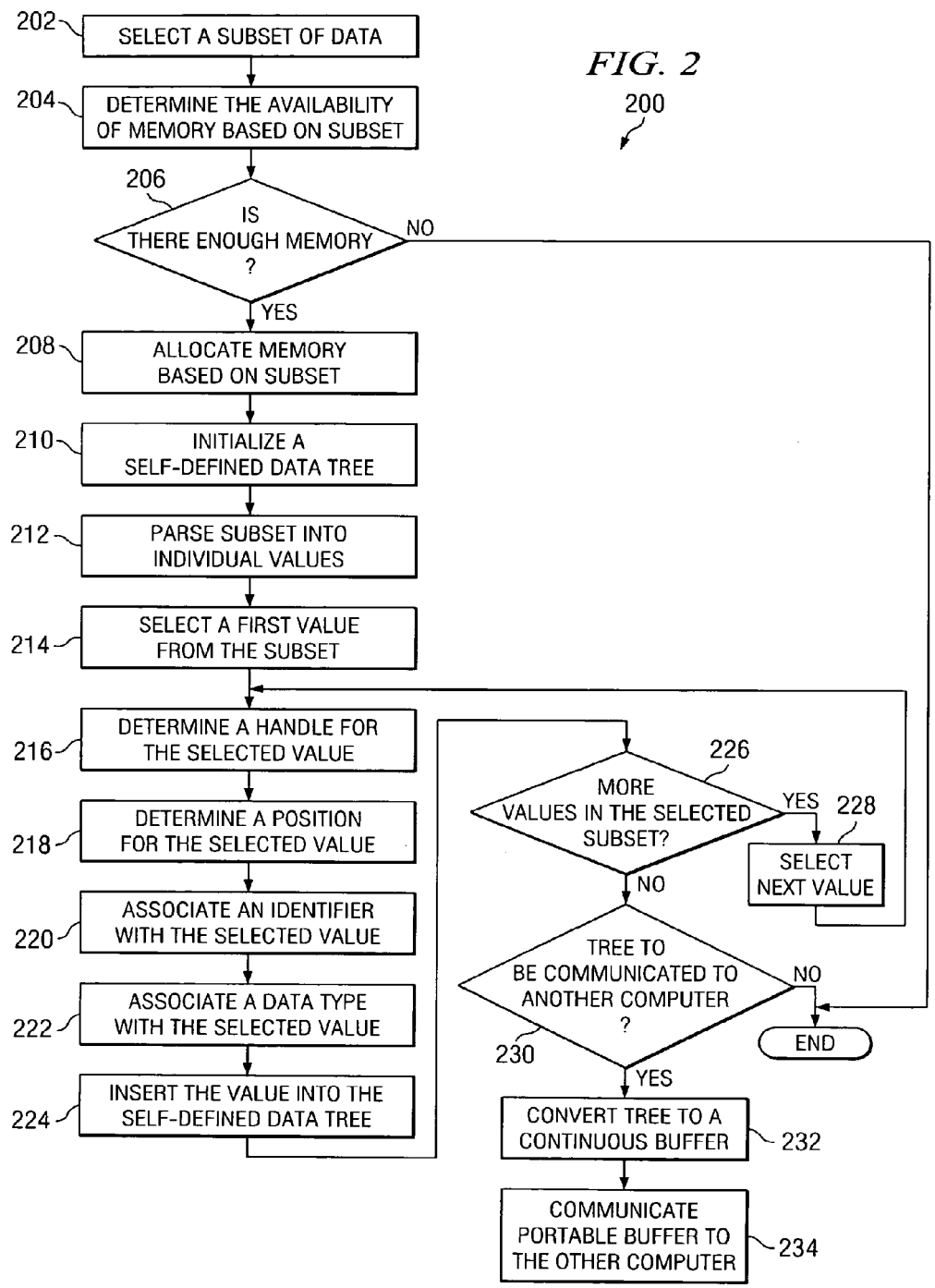
FIG. 2 is a flowchart illustrating an example method for communicating data in accordance with one embodiment of the present disclosure.

FIG. 2 is a flowchart illustrating an example method 200 for communicating data in accordance with one embodiment of the present disclosure. Generally, FIG. 2 describes method 200, which receives or retrieves a data subset, including non-numeric values, from dataset 135, creates a device-independent representation of the data, and communicates the device-independent data to a remote compute using a generated portable buffer 150. The following descriptions focuses on the operation of SDD engine 130 in performing method 200. But system 100 contemplates using any appropriate combination and arrangement of logical elements implementing some or all of the described functionality.

Method 200 begins at step 202, where SDD engine 130a selects or receives a selection of a subset of data from dataset 135 at step 202. It will be understood that the selection may be dynamic, automatic, or in response to a request from a user or another computing process. Next, SDD engine 130a determines the availability of memory 120 based on the selected subset at step 204. If there is not enough memory at decisional step 206, then processing ends. It will be understood, that alternatively SDD engine 130a may put a request into a queue or round-robin to await free memory 120. Once there is enough memory 120, then SDD engine 130a allocates memory 120 based on the subset at step 208. Next, at step 210, SDD engine 130a initializes a first self-defined data tree 140a. Once data tree 140a is initialized, SDD engine 130a parses the selected subset into individual data objects or values at step 212. Next, in steps 214 through 228, SDD engine 130a populates the initialized data tree 140a based on the parsed data and the associated characteristics.

At step 214, SDD engine 130a selects a first value from this parsed subset. A handle is determined for the selected value, at step 216, as well as a position for the selected value, at step 218. As described earlier, the handle, such as SDD_HANDLE, and the position, such as SDD_POSITION, represent a logical location in tree 140. At step 220, SDD engine 130a associates an optional identifier name with the selected value. SDD engine 130a then associates a data type with the selected value at step 222. The data type may be any value selected from the group including float, long integer, short integer, double, character, string, Boolean, binary, or any other appropriate data type. Once the appropriate characteristics of the selected value have been determined in steps 216 through 222, the value and the appropriate associated characteristics are inserted into self-defined data tree 140a at step 224. This insertion may include any conversion technique operable to convert the values into an appropriate device-independent data format such as, for example, UTF-8. SDD engine 130a then determines if there are more values in the selected subset at decisional step 226. If there are more values, then SDD engine 130a selects the next value at step 228 and processes and returns to step 216. Otherwise, the population of self-defined data tree 140a is considered substantially complete.

According to certain embodiments, SDD engine 130a determines if the populated tree 140a is to be communicated to second computer 102b. For example, SDD engine 130a may automatically communicate tree 140a, communicate tree 140a in response to request from the user of any computing device in system 100, or use any other appropriate determination technique. If tree 140 is not to be communicated to another computer, then processing ends. Otherwise, SDD engine 130a converts or packages tree 140s into continuous portable buffer 150 at step 232. Once portable buffer 150 is generated, computer 102a communicates portable buffer 150 to second computer 102b via network 108 at step 234.

Figure 3:
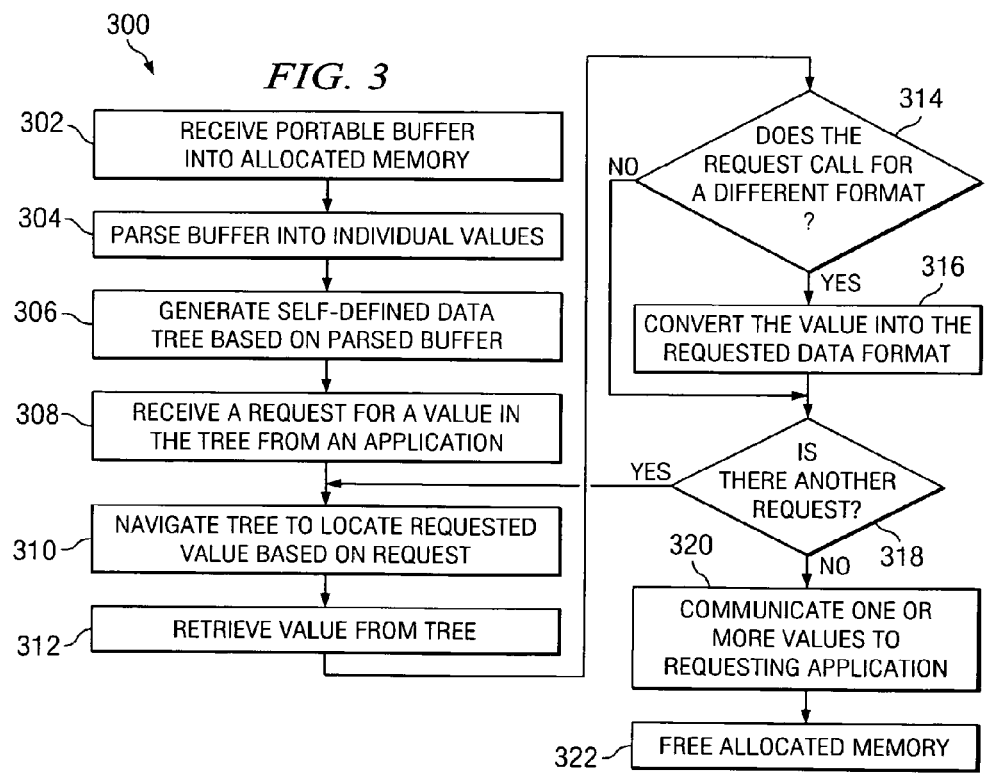
FIG. 3 is a flowchart illustrating an example method for processing a received portable buffer comprising device-independent data in accordance with one embodiment of the present disclosure.

FIG. 3 is a flowchart illustrating an example method 300 for processing a received portable buffer 150, the buffer 150 comprising device-independent data in accordance with one embodiment of the present disclosure. At a high level, method 300 describes an example technique including receiving portable buffer 150 from network 108, creating a self-defined data tree 140, and, when appropriate, converting and communicating the data to application 160 or memory 120 in the appropriate format. The following description will focus on the operation of SDD engine 130b in performing this method. But, as with the previous flowchart, system 100 contemplates using any appropriate combination and arrangement of logical elements implementing some or all of the described functionality.

Method 300 begins when second computer 102b receives portable buffer 150 into allocated memory 120b at step 302. Once received, SDD engine 130b parses buffer 150 into individual values or entries at step 304. Next, at step 306, SDD engine 130b generates or initializes a self-defined data tree 140b based on the parsed buffer. At step 308, SDD engine 130b receives a request for one of the values in tree 140 from an application 160. SDD engine 130b navigates tree 140 to locate the requested value based on the request. For example, the request from application 160 may include a handle in position, an identifier, or any other appropriate parameter operable to locate the requested value or entry. SDD engine 130b retrieves the requested value from tree 140 at step 312. Next, SDD engine 130b determines if the request called for a different data format at decisional step 314. If it does, then SDD engine 130b converts the value stored in tree 140 into the requested data format such as, for example, Unicode (UTF-16) or multibyte at step 316. Next, or if the request did not call for a different data format, SDD engine 130b determines if there is another request at decisional step 318. If there are more requests, then processing returns to step 310 where the next request is processed similarly to the first request. Once all the requests have been suitably processed at decisional step 318, SDD engine 130b communicates the one or more values to requesting application 160. According to certain embodiments, it will be understood that requesting application 160 may then utilize any appropriate processing without requiring the conversion of one encoding format to another. Finally, at step 322, SDD engine 130b frees any memory 120b allocated based on received portable buffer 150.

The preceding flowcharts and accompanying description illustrate methods 200 and 300 for example purposes only. In short, system 100 contemplates computer 102 using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A data packaging method, comprising:
receiving a dataset that includes a data value encoded in a first device-dependent format associated with a first operating system;
determining, on a processor, a handle and a position associated with the data value in the received dataset, wherein the handle combined with the position represent a logical location that the data value has in a hierarchy to organize the data value;
converting, on the processor, the data value in the received dataset from the first device-dependent format into an intermediate device-independent format;
inserting the converted data value into a data tree, wherein the processor inserts the converted data value into the data tree at the logical location that the converted data value has in the hierarchy to populate the data tree; and
communicating the populated data tree to a computing device that executes a second operating system comprising data in a second device-dependent format incompatible with the first device-dependent format associated with the first operating system, wherein the computing device transforms the converted data value in the populated data tree from the intermediate device-independent format into the second device-dependent format to process the converted data value in the populated data tree.

2. The data packaging method recited in claim 1, wherein the communicating the populated data tree to the computing device further comprises communicating the populated data tree to the computing device within a portable buffer that packages the populated data tree.

3. The data packaging method recited in claim 1, further comprising inserting an identifier that identifies a data type associated with the converted data value into the data tree at the logical location that the converted data value has in the hierarchy to further populate the data tree.

4. The data packaging method recited in claim 3, wherein the intermediate device-independent format comprises a UTF-8 encoded string format and the converted data value inserted into the data tree has the UTF-8 encoded string format.

5. The data packaging method recited in claim 4, wherein the identifier comprises a UTF-8 character string identifier and the populated data tree communicated to the computing device comprises the converted data value having the UTF-8 encoded string format and the UTF-8 character string identifier having the UTF-8 encoded string format.

6. The data packaging method recited in claim 1, further comprising:
allocating memory to the data tree in response to determining that the processor has enough available memory to store the data value in the dataset; and
queuing a request to allocate the memory to the data tree in response to determining that the processor does not have enough available memory to store the data value in the dataset, wherein the queued request waits to allocate the memory to the data tree until the processor has enough available memory to store the data value in the dataset.

7. The data packaging method recited in claim 6, further comprising freeing the allocated memory in response to communicating the populated data tree to the computing device.

8. The data packaging method recited in claim 1, wherein the computing device navigates to the logical location that the converted data has in the populated data tree to retrieve and process the converted data value in the populated data tree.

9. A data packaging system, wherein the system comprises a processor configured to:
receive a dataset that includes a data value encoded in a first device-dependent format associated with a first operating system;
determine a handle and a position associated with the data value in the received dataset, wherein the handle combined with the position represent a logical location that the data value has in a hierarchy to organize the data value;
convert the data value in the received dataset from the first device-dependent format into an intermediate device-independent format;
insert the converted data value into a data tree at the logical location that the converted data value has in the hierarchy; and
communicate the populated data tree to a computing device configured to execute a second operating system comprising data in a second device-dependent format incompatible with the first device-dependent format associated with the first operating system, wherein the computing device is further configured to transform the converted data value in the populated data tree from the intermediate device-independent format into the second device-dependent format to process the converted data value.

10. The data packaging system recited in claim 9, wherein the processor is configured to communicate the populated data tree to the computing device within a portable buffer.

11. The data packaging system recited in claim 9, wherein the processor is further configured to insert an identifier that identifies a data type associated with the converted data value into the data tree at the logical location that the converted data value has in the hierarchy.

12. The data packaging system recited in claim 11, wherein the intermediate device-independent format comprises a UTF-8 encoded string format and the converted data value inserted into the data tree has the UTF-8 encoded string format.

13. The data packaging system recited in claim 12, wherein the identifier comprises a UTF-8 character string identifier and the populated data tree comprises the converted data value having the UTF-8 encoded string format and the UTF-8 character string identifier having the UTF-8 encoded string format.

14. The data packaging system recited in claim 9, wherein the processor is further configured to:
 allocate memory to the data tree in response to the processor having enough available memory to store the data value in the dataset; and
 queue a request to allocate the memory to the data tree in response to the processor not having enough available memory to store the data value in the dataset, wherein the queued request waits to allocate the memory to the data tree until the processor has enough available memory to store the data value in the dataset.

15. The data packaging system recited in claim 14, wherein the processor is further configured to free the allocated memory in response to communicating the populated data tree to the computing device.

16. The data packaging system recited in claim 9, wherein the computing device is further configured to navigate to the logical location that the converted data value has in the populated data tree to retrieve and process the converted data value in the populated data tree.

17. A computer program product comprising:
 a non-transitory computer readable storage medium having computer readable program code embodied therewith, the computer readable program code comprising:
 computer readable program code configured to cause a processor to receive a dataset that includes a data value encoded in a first device-dependent format associated with a first operating system;
 computer readable program code configured to determine a handle and a position associated with the data value in the received dataset, wherein the handle combined with the position represent a logical location that the data value has in a hierarchy to organize the data value;
 computer readable program code configured to convert the data value in the received dataset from the first device-dependent format into an intermediate device-independent format;
 computer readable program code configured to insert the converted data value into a data tree at the logical location that the converted data value has in the hierarchy to populate the data tree; and
 computer readable program code configured to communicate the populated data tree to a computing device that executes a second operating system comprising data in a second device-dependent format incompatible with the first device-dependent format associated with the first operating system, wherein the computing device transforms the converted data value in the populated data tree from the intermediate device-independent format into the second device-dependent format to process the converted data value in the populated data tree.

18. The computer program product recited in claim 17, wherein the computer readable program code configured to communicate the populated data tree to the computing device is further configured to communicate the populated data tree within a portable buffer that packages the populated data tree.

19. The computer program product recited in claim 17, further comprising computer readable program code configured to insert an identifier that identifies a data type associated with the converted data value into the data tree at the logical location that the converted data value has in the hierarchy to further populate the data tree.

20. The computer program product recited in claim 19, wherein the intermediate device-independent format comprises a UTF-8 encoded string format and the converted data value inserted into the data tree has the UTF-8 encoded string format.

21. The computer program product recited in claim 20, wherein the identifier comprises a UTF-8 character string identifier and the populated data tree communicated to the computing device comprises the converted data value having the UTF-8 encoded string format and the UTF-8 character string identifier having the UTF-8 encoded string format.

22. The computer program product recited in claim 17, further comprising:
 computer readable program code configured to allocate memory to the data tree in response to determining that the processor has enough available memory to store the data value in the dataset; and
 computer readable program code configured to queue a request to allocate the memory to the data tree in response to determining that the processor does not have enough available memory to store the data value in the dataset, wherein the queued request waits to allocate the memory to the data tree until the processor has enough available memory to store the data value in the dataset.

23. The computer program product recited in claim 22, further comprising computer readable program code configured to free the allocated memory in response to communicating the populated data tree to the computing device.

* * * * *